2,869,983

SEPARATION OF METAL SALTS BY ADSORPTION

Dieter M. Gruen, Downers Grove, Ill., assignor to the United States of America as represented by the United States Atomic Energy Commission No Drawing. Application November 13, 1957
Serial No. 696,301

15 Claims. (Cl. 23—14.5)

This invention deals with the separation of metal salts by adsorption, and in particular with the separation of metal salts in their anhydrous state.

It is an object of this invention to provide a process of recovering metal salts by which the salts are obtained in a highly concentrated form.

It is another object of this invention to provide a process of separating actinide values, such as uranium values, from fission product values in which the fission products are obtained in a highly concentrated form so that no concentration step is required before their disposal.

It has been found that anhydrous mineral acid salts, such as the chlorides, nitrates and sulfates of the so-called transition metals, which are the metals that occupy the middle position in the long periods or form group VIII in the Periodic Table of Elements, and also anhydrous salts of the actinides, when dissolved in molten alkali metal nitrate, are adsorbed on aluminum oxide and thus removed from the alkali metal nitrate. On the other hand, experimental studies showed that rare earth metal salts, such as for instance neodymium chloride and praseodymium chloride, are not adsorbed and leave the aluminum oxide with the alkali metal nitrate effluent. Salts that were adsorbed on the aluminum oxide, are ferric chloride, cobaltous chloride, nickelous chloride, and cupric chloride and the bromides of these metals; the actinides salts that are adsorbed on aluminum oxide are uranyl chloride and neptunium pentachloride.

While any kind of alumina is operative for the process of this invention, the $\gamma$-type aluminum oxide is preferred, which is aluminum oxide that has been prepared by heating precipitated hydrous aluminum oxide to a temperature of up to 400° C. It was also tried to use sodium aluminum silicate of the formula $Na_2O.Al_2O_3.2SiO_2$ as the adsorbent; however, this material was found to be nonoperative.

Suitable solvents for the metal salts are alkali metal nitrates; the preferred solvent, however, is the eutectic mixture of lithium nitrate and potassium nitrate (43 mole percent of lithium nitrate), which melts at 132° C. The alkali metal nitrate, prior to use, was preferably first dried at about 110° C., then melted and finally further dehydrated by bubbling nitrogen through the melt for from 10 to 15 minutes. The metal salts were dissolved in the lithium nitrate-potassium nitrate eutectic preferably in a quantity to yield a concentration of from about 0.01 to 0.1 M; however, other concentrations were also operative.

Other salt mixtures were also tested as the solvent; for instance, the eutectic of lithium and potassium chlorides, pyridinium chloride and also anhydrous ammonium formate were studied. The alkali metal chlorides and pyridinium chloride were found to be nonoperative; however, the ammonium formate proved satisfactory. The mechanism of the adsorption is not known, and an explanation cannot be given for the operativeness of the nitrates and the nonoperativeness of the chlorides as the solvent. It is likely that the chlorides in the solvent form complexes with the metal salts to be adsorbed and that these complexes are not adsorbable on the alumina.

The lack of adsorbability of the metal salts in the presence of chlorides or other halides in the solvent was utilized for the elution of the adsorbed salt or salts from the aluminum oxide. An eluant containing the lithium nitrate-potassium nitrate eutectic and a halide additive proved to be satisfactory. Potassium, lithium or ammonium chloride were found to be suitable elution additives.

The process of this invention thus comprises dissolving the salt to be adsorbed, or the mixture containing said salt or salts, in a molten alkali metal nitrate, contacting aluminum oxide with the molten solution thus formed whereby the metal salt is adsorbed on the aluminum oxide, and separating the aluminum oxide containing said metal salt from the molten solution. The invention also comprises the elution of the adsorbed metal salt with a molten alkali halide-containing alkali metal nitrate.

The capacity of alumina for the metal salts is pretty high; for instance, for cobaltous chloride it was found to be 0.5 milliequivalent per gram of aluminum oxide, while for uranyl chloride it was 0.4 milliequivalent per gram of aluminum oxide.

The composition of the eluant can vary widely; but a concentration of from 0.1 to 3 M of chloride in the $LiNO_3$—$KNO_3$ eutectic was preferred. The melting points of these eluant mixtures are below 150° C. so that both, adsorption and elution, can be carried out at relatively low temperatures. When a chloride concentration of 3 M was used in the eluant, the quantity of the metal salt eluted from the aluminum oxide was always above 95 percent of that adsorbed. The quantity of eluant necessary for complete elution of the adsorbed salt increases with decreasing chloride content.

While the process can be carried out by shaking or agitating the aluminum oxide with the metal salt solution in a container, flowing the salt solution through a column containing the adsorbent is preferred.

The aluminum oxide was advantageously subjected to a pretreatment prior to packing it into the adsorption column. For this purpose it was heated at from 350 to 400° C. for several hours in a tube evacuated to less than $10^{-4}$ mm. Hg whereby all the gas adsorbed on the aluminum oxide was removed. The degassed aluminum oxide was cooled while the vacuum was still maintained, and molten alkali metal nitrate was then flowed into the tube without lifting the vacuum; all pores of the aluminum oxide were filled thereby with the alkali metal nitrate. The mixture of aluminum oxide and alkali metal nitrate was then furthermore mixed or slurried by shaking or agitating it while maintaining the temperature above the melting point of the eutectic.

This slurry was then ready to be poured into an adsorption column. The adsorption column used in the experiments herein described consisted of a Pyrex tube having an inner diameter of 8 mm.; it was filled with $\gamma$-type aluminum oxide to a height of from 8 to 10 cm. The particle size of the alumina preferably ranged from 150 to 200 mesh. The tube, with the except of a 2 to 3 mm. tip was surrounded by a Pyrex jacket of an inner diameter of 2 inches which was connected by two ball joints to a 1 liter boiling flask containing a high-boiling organic liquid. The organic vapors from this liquid were circulated through the jacket to keep the column at a constant temperature. Another outer jacket was arranged around this first jacket for the purpose of minimizing heat losses; the space between the two jackets was evacuated.

The unjacketed top portion of the adsorption tube was surrounded by a coil of Nichrome which was heatable by an electric current. This top portion contained the metal salt solution in alkali metal nitrate to be treated. It served as a mechanism for starting and stopping the column operation. When the metal salt solution was melted by heating the coil, the adsorption process was started. When heating was discontinued, the drops of the metal salt solution solidified and thereby automatically stopped the column operation.

The organic liquid found best suitable for heating the metal salt solution in the lithium nitrate-potassium nitrate eutectic was isopropyl benzene which has a boiling point of 152° C. It is understood, of course, that a great many other substances are usable and that their selection depends on the temperature desired. For instance, p-terphenyl has been used to maintain a temperature of 350° C.

The column was slightly pressurized with nitrogen, for example, of from 1 to 2 lbs. of pressure, before the adsorption operation was started.

The process of this invention is particularly useful for the separation of actinides from lanthanum-group rare earth metal values, for instance, for the separation of uranium from fission products as they are present in neutron-irradiated uranium. In order to apply the process to neutron-irradiated uranium, the latter is first converted to the chlorides or other mineral acid salt, for instance, by chlorination with chlorine gas at elevated temperature. This phase of the process, however, is not part of this invention.

The process is also applicable to the separation of other metal salts; thus, a separation was carried out of cobalt, copper and nickel chlorides contained in a lithium nitrate-potassium nitrate mixture. In this separation the chlorides were first quantitatively adsorbed on the aluminum oxide; they were then separated by fractional elution with a lithium nitrate-potassium nitrate eutectic that was 3 M in ammonium chloride. The eluates were collected in fractions and analyzed. It was found that the cobalt came off first, that the copper was eluted from the column after the cobalt and that the nickel was eluted last.

In the following an example is given to illustrate the process of this invention but not to limit the invention to the details given therein.

*Example*

About 1 g. of neutron-irradiated uranium metal containing 0.85 percent by weight of fission products is dissolved in 20 ml. of 6 N nitric acid at room temperature. The solution formed is allowed to evaporate to dryness, the heat necessary being developed by disintegration of the fission products. The dry residue thus formed is contacted with 50 ml. of fused lithium nitrate-potassium nitrate eutectic at 150° C.; the uranium and the fission product nitrates dissolve while a small residue of plutonium nitrate remains.

The plutonium-containing residue is removed from the melt by filtering the latter through a sintered glass disc. The solution is then flowed through an adsorption column which contains 100 g. of γ-type aluminum oxide; the column had an inner diameter of 15 mm. In this step the uranyl nitrate is adsorbed on the aluminum oxide forming a broad yellow band at the top of the column.

The effluent from this step contains about 30 percent of the total $\beta$- and $\gamma$-activity that was present in the salt solution introduced into the column.

Thereafter 30 ml. of the lithium nitrate-potassium nitrate eutectic which is 3 M in a lithium chloride-potassium chloride mixture is passed through the aluminum oxide column; the lithium chloride and potassium chloride were present in that mixture in the ratio that corresponds to the ratio of Li:K present in the lithium nitrate-potassium nitrate eutectic. The effluent in this elution step contains about 60 percent of the initial radioactivity, but only negligible amounts of uranium.

Thereafter, an additional 30 ml. of the lithium chloride-potassium chloride-containing nitrate eutectic are passed through the adsorption column. In this second elution step the uranium is removed, and the effluent contains about 95 percent of the total uranium present.

The aluminum oxide is then washed with lithium nitrate-potassium nitrate eutectic to remove chloride anions therefrom; the aluminum oxide is thereby regenerated and made ready for reuse.

It will be understood that this invention is not to be limited to the details given herein, but that it may be modified within the scope of the appended claims.

What is claimed is:

1. A process of separating metal mineral acid salts selected from the group consisting of actinide halide, actinide nitrate, copper halide, nickel halide, cobalt halide and iron halide from mixtures containing said salts, comprising dissolving said salts in the anhydrous state in molten alkali metal nitrate; contacting aluminum oxide with the molten solution thus obtained whereby the molten metal salt is adsorbed on the aluminum oxide; and separating the aluminum oxide from the molten alkali metal nitrate solution.

2. The process of claim 1 wherein the metal salt is present in the nitrate solution in a concentration of from 0.01 to 0.1 M.

3. The process of claim 1 wherein the alkali metal nitrate is a mixture of lithium nitrate and potassium nitrate.

4. The process of claim 3 wherein the mixture is the eutectic.

5. The process of claim 1 wherein the alkali metal nitrate is dehydrated nitrate.

6. The process of claim 1 wherein the aluminum oxide is the γ-type aluminum oxide.

7. The process of claim 1 wherein the metal salt is removed from the aluminum oxide by contacting with an alkali halide-containing alkali metal nitrate eluant, said alkali halide being selected from the group consisting of alkali metal chlorides and ammonium chloride.

8. The process of claim 7 wherein the eluant is the lithium nitrate-potassium nitrate eutectic and contains said alkali chloride in a concentration of from 0.1 to 3 M.

9. The process of claim 8 wherein the alkali chloride is potassium chloride.

10. The process of claim 8 wherein the alkali chloride is lithium chloride.

11. The process of claim 8 wherein the alkali chloride is ammonium chloride.

12. A process of separating actinide mineral acid salt from mixtures derived from neutron-irradiated uranium and containing said actinide mineral acid salt and lanthanum-group rare earth metal mineral acid salt, said mineral acid salts being selected from the group consisting of nitrates and chlorides, comprising dissolving said salts in the anhydrous state in molten lithium nitrate-potassium nitrate eutectic; contacting aluminum oxide with the molten solution thus obtained whereby actinide salt is adsorbed on said aluminum oxide while rare earth metal salt remains in the molten solution; and separating the aluminum oxide from the molten alkali metal nitrate solution.

13. The process of claim 12 wherein the actinide salt is eluted from the aluminum oxide by contacting with a solution of alkali halide in the lithium nitrate-potassium nitrate eutectic, said alkali halide being selected from the group consisting of alkali metal chlorides and ammonium chloride.

14. A process of separating uranyl nitrate from a mixture containing said uranyl nitrate and fission product nitrates, comprising dissolving said nitrates in the anhydrous state in the lithium nitrate-potassium nitrate eutectic using a quantity to yield a uranyl nitrate concentration of about 0.01 M; contacting aluminum oxide with the molten solution thus obtained whereby uranyl nitrate is adsorbed on the aluminum oxide while fission product nitrates remain in the molten solution; and separating the aluminum oxide from the molten alkali metal nitrate solution.

15. The process of claim 14 wherein the uranyl nitrate is eluted from the aluminum oxide by contacting it with about 3 M solution of alkali chloride in the lithium nitrate-potassium nitrate eutectic, said alkali chloride being selected from the group consisting of alkali metal chlorides and ammonium chloride.

References Cited in the file of this patent

UNITED STATES PATENTS 2,819,144     Seaborg et al. _____ Jan. 7, 1958